UNITED STATES PATENT OFFICE.

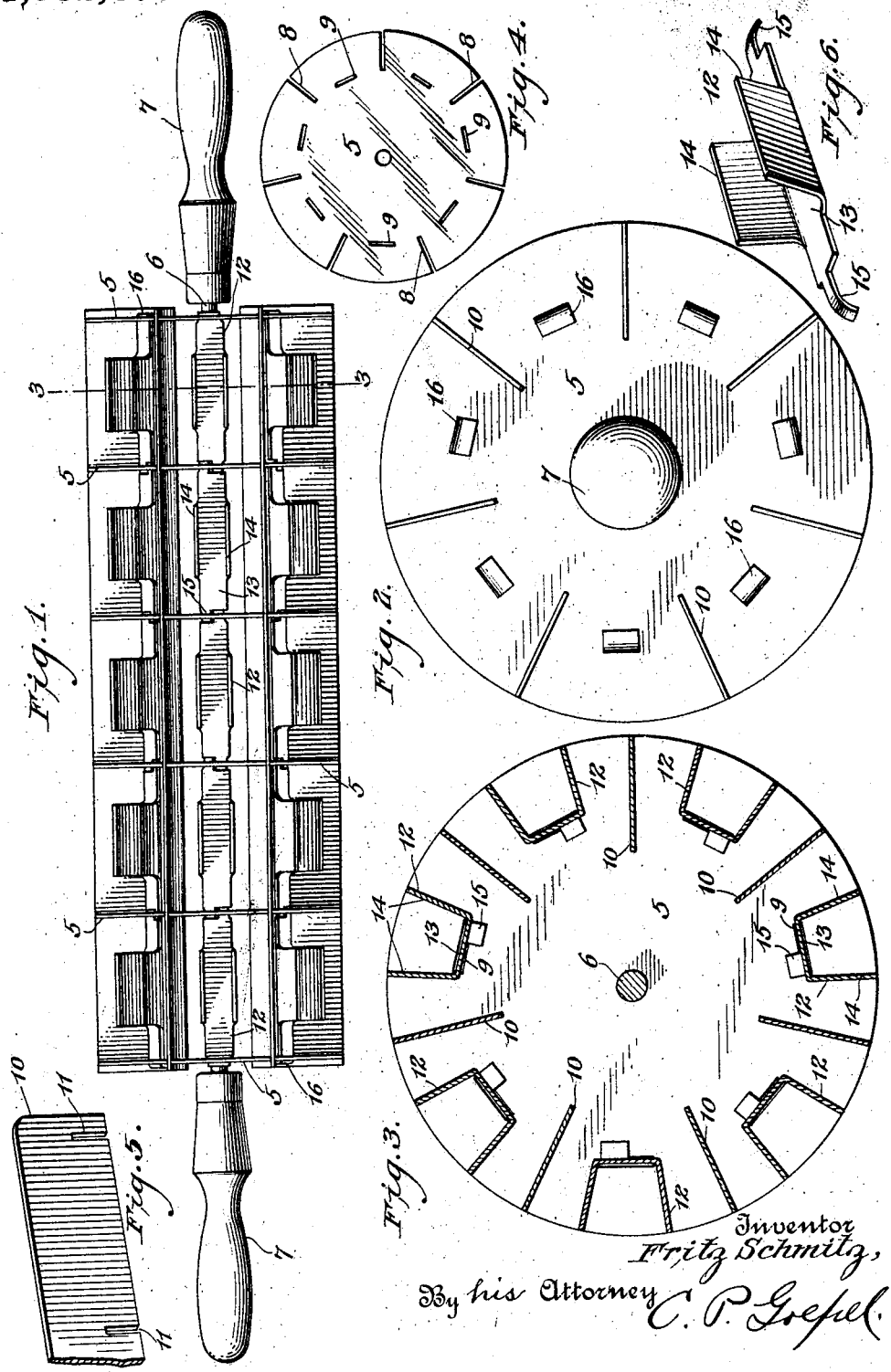

FRITZ SCHMITZ, OF BROOKLYN, NEW YORK, ASSIGNOR TO JABURG BROTHERS, OF NEW YORK, N. Y., A FIRM OF NEW YORK.

CULINARY IMPLEMENT.

1,382,677.  Specification of Letters Patent.  Patented June 28, 1921.

Application filed December 1, 1920. Serial No. 427,513.

*To all whom it may concern:*

Be it known that I, FRITZ SCHMITZ, a citizen of the German Republic, and resident of Brooklyn, in the county of Kings and State of New York, have invented new and useful Culinary Implements, of which the following is a specification.

This invention relates to culinary implements and more particularly to a device for cutting out dough in various shapes or forms in the baking of pasteries.

My present invention has for its primary object to provide a device for the above purpose in the form of a roller die for quickly cutting out from the flattened dough sheet a large number of separate portions of proper size suitably scored or otherwise marked whereby a final product of the desired configuration will be obtained.

More particularly my invention comprehends the provision of a roller die consisting of a plurality of laterally spaced disks fixed upon a central rod or axis and a series of spaced longitudinally extending cutting bars connecting said disks at their outer edges together with cutting or scoring members arranged between the longitudinal bars and separated by said spaced disks.

In general I contemplate the provision of a device for the above purpose which is of simple as well as strong and durable construction, of great utility and capable of manufacture at comparatively small cost.

With the above and other objects in view the invention consists in the improved form, construction and relative arrangement of the several parts as will be hereinafter more fully described, illustrated in the accompanying drawing and subsequently incorporated in the subjoined claims.

In the drawing wherein I have illustrated one practical and satisfactory embodiment of the invention and in which similar reference characters designate corresponding parts throughout the several views:

Figure 1 is a side elevation of my improved cutting roller.

Fig. 2 is an end view.

Fig. 3 is a section taken on the line 3—3 of Fig. 2.

Fig. 4 is an elevation of one of the disks.

Fig. 5 is a fragmentary perspective view of one of the longitudinal cutting bars and Fig. 6 is a perspective view of one of the cutting or scoring members.

Referring in detail to the drawing, 5 designates a series of laterally spaced cutting disks which are fixed in any suitable manner upon a common central rod or axis 6. To the ends of this axis suitable handles 7 are attached.

Each of the disks 5 is provided with a series of radially extending spaced slots 8, said slots opening upon the outer edge of the disk. Between the slots 8, the disk is further provided in spaced relation to its outer edge with the short circumferentially disposed slots 9 the purpose of which will be hereinafter explained.

In conjunction with the cutting disks 5 longitudinally extending cutting bars 10 are employed and each of these bars is provided with the spaced transverse slots 11 extending inwardly from one edge of the bar. The bars 10 are adapted to be engaged in the radial slots 8 of the disks 5, said disks inwardly of the slots 8 being received in the slots 11 of the longitudinal bars so that the outer edges of these bars are flush with the peripheral surfaces of the several cutting disks 5. The bars 10 are securely held in assembled relation with the disks by the frictional wedging action of said bars and disks with each other.

From the above description it will be seen that the arrangement of the laterally spaced cutting disks and the longitudinally extending cutting bars provides a plurality of parallelogrammatic spaces or cavities into which the dough will be received as the implement is rolled upon the sheet of dough or other plastic material. Therefore a plurality of rectangular portions would be cut from the dough sheet without leaving scraps which must subsequently be collected and again rolled out as is necessary when a single cutting die or implement is employed.

In the baking of crullers of the well known twisted variety, spaced slots or incisions are cut in the rectangular portions of the dough and for this purpose I provide the members 12 each of which is formed from a single piece of metal stamped or cut out of a metal sheet. This member has a body portion 13 and an angularly disposed cutting flange 14 extends along each longitudinal edge of the body portion 13 but terminates in spaced relation to the ends of said body portion. At its extremities the body portion 13 is formed with the longitudinally projecting fingers 15, the said fingers being slightly curved or bent as shown in Fig. 6. These members 12 are arranged in the spaces defined by the disks 5 and the bars 10 as the several parts are assembled, the fingers 15 being inserted through the slats 9 in the cutting disks 5. The curved finger on the end of one of the members 12 occupies one end of the slot 9 and the curved finger on the end of a longitudinally adjacent member 12 occupies the other end of said slot, said fingers extending under the ends of the body plates 13 of said members. This statement however applies only to the mounting of the members 12 in the intermediate disks. The members 12 which are supported in the end disks 5 of the roller are not provided on one of their ends with the fingers 15 but the end of the body plate 13 is extended through the slots 9 in these end disks and then bent downwardly on the outer surfaces of the end disks as shown at 16 in Fig. 2 of the drawing. In this manner, it will be seen that all of the parts are permanently and rigidly assembled so that the device in effect is in the form of a single integral structure.

From the above description the use of the article or implement will be apparent. In operating upon a sheet of dough, each of the rectangular dough portions which are cut out by the laterally spaced disks and the longitudinal cutting bars will be provided with spaced longitudinally extending incisions therethrough, such incisions being formed by the flanges 14 of the members 12. These flanges preferably extend in slightly divergent relation to each other and in radial relation to the rod or axis 6. The improved roller die might also be advantageously used in the cutting of candy or other plastic materials, and die elements of various other forms substituted for the members 12 in case it is merely desired to impress a certain design in the material instead of providing the incisions therein. As the several parts of the implement can be readily stamped or cut from sheet material, it will be appreciated that such a device may be manufactured and sold at comparatively small cost.

I have herein shown and described a construction which I deem to be preferable but it will be understood that the device may also be produced in various other alternative constructions. Accordingly the privilege is reserved of adopting all such legitimate changes or modifications as may be fairly embodied within the spirit and scope of the invention as claimed.

I claim:

1. A culinary article of the kind described comprising a roller consisting of a series of laterally spaced cutting disks and spaced longitudinally extending bars associated with said disks in radial relation to the axis of the roller and having their outer longitudinal edges disposed in the plane of the peripheral faces of the disks, and die members arranged between the longitudinal bars and supported by said disks.

2. A culinary article of the kind described comprising a roller consisting of a series of laterally spaced cutting disks and spaced longitudinally extending bars associated with said disks in radial relation to the axis of the roller and having their outer longitudinal edges disposed in the plane of the peripheral faces of the disks, each of said disks being provided in spaced relation to its edge and between the longitudinal bars with circumferentially disposed slots, and die members arranged between the longitudinal bars and having parts extending through the slots in the adjacent disks to support said die members in a central position between the longitudinal bars.

3. A culinary article of the kind described comprising a roller consisting of a series of laterally spaced cutting disks and spaced longitudinally extending bars associated with said disks in radial relation to the axis of the roller and having their outer longitudinal edges disposed in the plane of the peripheral faces of the disks, die members adapted to be arranged between the spaced longitudinal bars and each having spaced cutting flanges disposed radially with respect to the roller axis, and means for supporting the die members upon the cutting disks.

4. A culinary article of the kind described comprising a roller consisting of a series of laterally spaced cutting disks and spaced longitudinally extending bars associated with said disks in radial relation to the axis of the roller and having their outer longitudinal edges disposed in the plane of the peripheral faces of the disks, die members adapted to be arranged between the spaced longitudinal bars and each having spaced cutting flanges disposed radially with respect to the roller axis, each cutting disk being provided between the longitudinal bars with circumferentially disposed slots and said die members having longitudinally extending fingers for engagement through the slots in said disk, the fingers on the opposed ends of adjacent die members occupying the same slot in the disk whereby the die members are supported in a central position between the longitudinal bars.

In testimony that he claims the foregoing as his invention, and has signed his name hereunder.

FRITZ SCHMITZ.